(12) United States Patent
Henry

(10) Patent No.: US 10,233,809 B2
(45) Date of Patent: Mar. 19, 2019

(54) APPARATUS AND METHODS FOR EXHAUST GAS RECIRCULATION FOR AN INTERNAL COMBUSTION ENGINE POWERED BY A HYDROCARBON FUEL

(71) Applicant: Southwest Research Institute, San Antonio, TX (US)

(72) Inventor: Cary A. Henry, Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 14/487,463

(22) Filed: Sep. 16, 2014

(65) Prior Publication Data

US 2016/0076488 A1  Mar. 17, 2016

(51) Int. Cl.
*F01N 3/20* (2006.01)
*F01N 3/10* (2006.01)
(Continued)

(52) U.S. Cl.
CPC ............ *F01N 3/206* (2013.01); *F01N 3/101* (2013.01); *F02B 33/42* (2013.01); *F02M 26/35* (2016.02);
(Continued)

(58) Field of Classification Search
CPC .... F02D 19/0671; F02M 26/43; F02M 26/36; F01N 2240/30
See application file for complete search history.

(56) References Cited

U.S. PATENT DOCUMENTS 1,563,608 A  12/1925  Wood
2,113,602 A   4/1938  Pratt
(Continued)

FOREIGN PATENT DOCUMENTS

GB  2110791 A  11/1982
JP  11247665 A   9/1999
(Continued)

OTHER PUBLICATIONS

International Search Report (dated Oct. 2, 2006) issued in International Patent Application No. PCT/US05/40483.(WO2006052993) (5 pgs).
(Continued)

*Primary Examiner* — Patrick Maines
(74) *Attorney, Agent, or Firm* — Grossman, Tucker et al.

(57) ABSTRACT

A method to process exhaust gas expelled from at least one cylinder of a plurality of cylinders of an internal combustion engine, the method comprising providing an internal combustion engine, wherein the engine comprises a steam hydrocarbon reformer including a steam reformation catalyst, treating exhaust gas of the engine containing hydrocarbon and water by reacting the hydrocarbon and water in the presence of the steam reformation catalyst in the steam hydrocarbon reformer to provide treated exhaust gas. The treated exhaust gas includes carbon monoxide gas and hydrogen gas produced from the reaction, and mixing the treated exhaust gas, including the carbon monoxide gas and hydrogen gas produced in the steam hydrocarbon reformer with air to provide the mixture of air and treated exhaust gas introduced into the cylinders of the engine.

10 Claims, 6 Drawing Sheets

(51) Int. Cl.
*F02M 26/35* (2016.01)
*F02M 26/43* (2016.01)
*F02M 26/46* (2016.01)
*F02B 33/42* (2006.01)
*F02M 25/12* (2006.01)
*F02M 26/05* (2016.01)

(52) U.S. Cl.
CPC ............ *F02M 26/43* (2016.02); *F02M 26/46* (2016.02); *F01N 2240/30* (2013.01); *F02M 25/12* (2013.01); *F02M 26/05* (2016.02); *Y02T 10/22* (2013.01)

(56) References Cited

U.S. PATENT DOCUMENTS

| | | | |
|---|---|---|---|
| 3,156,162 A | 11/1964 | Wallace et al. | |
| 3,303,831 A | 2/1967 | Sherman | |
| 3,405,679 A | 10/1968 | Norris et al. | |
| 3,405,697 A | 10/1968 | Marchand | |
| 3,680,534 A | 8/1972 | Chavant | |
| 3,805,752 A | 4/1974 | Cataldo | |
| 3,924,576 A | 12/1975 | Siewert | |
| 3,941,113 A | 3/1976 | Bauelin | |
| 3,958,540 A | 5/1976 | Siewert | |
| 3,963,000 A | 6/1976 | Kosaka et al. | |
| 4,004,554 A | 1/1977 | Kosaka et al. | |
| 4,059,076 A | 11/1977 | Kosaka et al. | |
| 4,108,114 A | 8/1978 | Kosaka et al. | |
| 4,131,095 A | 12/1978 | Ouchi | |
| 4,179,892 A | 12/1979 | Heydrich | |
| 4,201,180 A | 5/1980 | Iizuka | |
| 4,224,912 A | 9/1980 | Tanaka | |
| 4,350,133 A | 9/1982 | Greiner | |
| 4,735,186 A * | 4/1988 | Parsons | F02B 1/10 123/3 |
| 4,783,966 A | 11/1988 | Aldrich | |
| 5,156,821 A * | 10/1992 | Murayama | B01J 8/067 422/211 |
| 5,178,119 A | 1/1993 | Gale | |
| 5,207,714 A | 5/1993 | Hayashi et al. | |
| 5,257,600 A | 11/1993 | Schechter et al. | |
| 5,297,515 A | 3/1994 | Gale et al. | |
| 5,343,699 A | 9/1994 | McAlister | |
| 5,379,728 A | 1/1995 | Cooke | |
| 5,456,240 A | 10/1995 | Kanesaka | |
| 5,515,814 A | 5/1996 | Cooke | |
| 5,517,976 A | 5/1996 | Bachle et al. | |
| 5,524,582 A | 6/1996 | Suh et al. | |
| 5,562,085 A | 10/1996 | Kosuda et al. | |
| 5,894,726 A | 4/1999 | Monnier | |
| 6,009,709 A | 1/2000 | Bailey | |
| 6,138,650 A | 10/2000 | Bailey | |
| 6,178,956 B1 | 1/2001 | Steinmann et al. | |
| 6,216,458 B1 | 4/2001 | Alger et al. | |
| 6,286,489 B1 | 9/2001 | Bailey | |
| 6,343,594 B1 | 2/2002 | Koeslin et al. | |
| 6,397,790 B1 * | 6/2002 | Collier, Jr. | F02B 43/00 123/3 |
| 6,425,381 B1 | 7/2002 | Rammer | |
| 6,478,017 B2 | 11/2002 | Bianchi | |
| 6,484,702 B1 | 11/2002 | Riley | |
| 6,508,209 B1 * | 1/2003 | Collier, Jr. | F02B 43/00 123/3 |
| 6,536,392 B2 | 3/2003 | Widener | |
| 6,543,230 B1 | 4/2003 | Schmid | |
| 6,543,411 B2 | 4/2003 | Raab et al. | |
| 6,609,374 B2 | 8/2003 | Feucht et al. | |
| 6,655,324 B2 | 12/2003 | Cohn et al. | |
| 6,672,292 B2 | 1/2004 | Fischer | |
| 6,742,507 B2 | 6/2004 | Keefer et al. | |
| 6,789,531 B1 | 9/2004 | Remmels | |
| 6,820,415 B2 | 11/2004 | Abet et al. | |
| 6,871,642 B1 | 3/2005 | Osterwald | |
| 6,877,464 B2 | 4/2005 | Hitomi et al. | |
| 6,877,492 B1 | 4/2005 | Osterwald | |
| 6,915,776 B2 | 7/2005 | zur Loye et al. | |
| 6,918,251 B2 | 7/2005 | Yanagisawa et al. | |
| 6,923,149 B2 | 8/2005 | Nishimoto et al. | |
| 6,945,235 B1 | 9/2005 | Bertilsson et al. | |
| 7,028,680 B2 | 4/2006 | Liu et al. | |
| 7,032,578 B2 | 4/2006 | Liu et al. | |
| 7,140,357 B2 | 11/2006 | Wei et al. | |
| 7,168,250 B2 | 1/2007 | Wei et al. | |
| 7,232,553 B2 | 6/2007 | Oh et al. | |
| 7,261,064 B2 | 8/2007 | Bhaisora et al. | |
| 7,290,504 B2 | 11/2007 | Lange | |
| 7,384,620 B2 | 6/2008 | Bowman et al. | |
| 7,389,770 B2 | 6/2008 | Bertilsson et al. | |
| 7,648,785 B2 | 1/2010 | Hu et al. | |
| 7,721,541 B2 | 5/2010 | Roberts, Jr. et al. | |
| 7,757,677 B2 | 7/2010 | Dobrila | |
| 7,779,823 B2 | 8/2010 | Winstead | |
| 7,801,664 B2 | 9/2010 | Winstead | |
| 7,818,959 B2 | 10/2010 | Hu et al. | |
| 7,945,376 B2 | 5/2011 | Geyer et al. | |
| 7,945,377 B1 | 5/2011 | Van Nieuwstadt et al. | |
| 8,100,093 B2 | 1/2012 | Morgenstern | |
| 8,291,891 B2 | 10/2012 | Alger, II et al. | |
| 8,311,723 B2 | 11/2012 | McAlister | |
| 8,387,593 B2 | 3/2013 | Ichihara et al. | |
| 8,463,529 B2 | 6/2013 | Hu | |
| 8,557,458 B2 | 10/2013 | Scotto et al. | |
| 8,561,599 B2 | 10/2013 | Gingrich et al. | |
| 8,668,752 B2 | 3/2014 | Scotto et al. | |
| 8,695,540 B2 | 4/2014 | Minick | |
| 8,752,532 B2 | 6/2014 | Korenaga et al. | |
| 8,838,367 B1 | 9/2014 | McAlister | |
| 8,893,687 B2 | 11/2014 | Gingrich et al. | |
| 8,904,786 B2 | 12/2014 | Hayman | |
| 8,944,034 B2 | 2/2015 | Gingrich et al. | |
| 8,966,896 B2 | 3/2015 | Jacques et al. | |
| 9,083,020 B2 | 7/2015 | Scotto | |
| 9,091,204 B2 | 7/2015 | McAlister | |
| 9,118,048 B2 | 8/2015 | Scotto | |
| 9,140,220 B2 | 9/2015 | Scotto | |
| 9,145,837 B2 | 9/2015 | Klingbeil | |
| 9,169,773 B2 | 10/2015 | Bromberg et al. | |
| 9,178,235 B2 | 11/2015 | Scotto et al. | |
| 9,206,769 B2 | 12/2015 | Burrahm | |
| 9,255,560 B2 | 2/2016 | McAlister | |
| 9,297,320 B2 | 3/2016 | Hilditch et al. | |
| 9,328,697 B2 | 5/2016 | Peters et al. | |
| 9,377,105 B2 | 6/2016 | McAlister | |
| 9,453,465 B2 * | 9/2016 | Bidner | F02M 26/36 |
| 9,464,584 B2 | 10/2016 | Gingrich et al. | |
| 9,574,487 B2 | 2/2017 | Gruber et al. | |
| 9,611,794 B2 | 4/2017 | Blythe et al. | |
| 9,657,692 B2 | 5/2017 | Chiu | |
| 9,797,349 B2 | 10/2017 | Henry | |
| 2001/0015193 A1 | 8/2001 | Tanaka et al. | |
| 2002/0189598 A1 | 12/2002 | Remmels | |
| 2003/0121484 A1 | 7/2003 | Wang | |
| 2004/0074480 A1 | 4/2004 | Chen et al. | |
| 2004/0099256 A1 | 5/2004 | Stewart | |
| 2005/0016792 A1 | 1/2005 | Graefenstein | |
| 2005/0022450 A1 | 2/2005 | Tan et al. | |
| 2006/0059896 A1 | 3/2006 | Liu et al. | |
| 2006/0070587 A1 | 4/2006 | Bhalsora et al. | |
| 2006/0112940 A1 | 6/2006 | Roberts, Jr. et al. | |
| 2007/0028901 A1 | 2/2007 | Watakabe et al. | |
| 2007/0193270 A1 | 8/2007 | Roozenboom et al. | |
| 2008/0295501 A1 * | 12/2008 | Gong | F02M 25/12 60/299 |
| 2009/0120385 A1 | 5/2009 | Munshi et al. | |
| 2009/0199825 A1 | 8/2009 | Piper et al. | |
| 2009/0308070 A1 | 12/2009 | Alger, II et al. | |
| 2011/0031162 A1 | 2/2011 | Drnevich et al. | |
| 2011/0041495 A1 | 2/2011 | Yager | |
| 2011/0114037 A1 * | 5/2011 | Bates | C01B 3/38 123/3 |
| 2011/0146267 A1 | 6/2011 | Hepburn et al. | |
| 2012/0006288 A1 | 1/2012 | Winstead | |
| 2012/0078492 A1 | 3/2012 | Freund et al. | |

(56) References Cited

U.S. PATENT DOCUMENTS

| | | |
|---|---|---|
| 2012/0167863 A1 | 7/2012 | Kulkarni |
| 2012/0204844 A1 | 8/2012 | Gingrich et al. |
| 2012/0204845 A1 | 8/2012 | Gingrich et al. |
| 2012/0216530 A1 | 8/2012 | Flynn et al. |
| 2012/0285426 A1 | 11/2012 | Hayman et al. |
| 2013/0000320 A1 | 1/2013 | McKenna et al. |
| 2013/0030672 A1 | 1/2013 | Klingbeil et al. |
| 2013/0133616 A1 | 5/2013 | Klingbeil |
| 2013/0216473 A1 | 8/2013 | Nicole et al. |
| 2013/0323145 A1 | 12/2013 | Tran et al. |
| 2014/0196697 A1 | 7/2014 | Burrahm |
| 2014/0196702 A1 | 7/2014 | Gingrich et al. |
| 2014/0223903 A1 | 8/2014 | Keating |
| 2014/0261322 A1 | 9/2014 | Geckler et al. |
| 2014/0331668 A1 | 11/2014 | Bidner et al. |
| 2014/0331970 A1 | 11/2014 | Bidner et al. |
| 2015/0166913 A1* | 6/2015 | Brody ............... C10L 3/10 48/127.7 |
| 2015/0361927 A1 | 12/2015 | Glugla |
| 2016/0017847 A1 | 1/2016 | Hilditch et al. |
| 2016/0245239 A1 | 8/2016 | Henry |
| 2016/0341157 A1 | 11/2016 | Henry |
| 2017/0074214 A1 | 3/2017 | Chiu |
| 2017/0363057 A1 | 12/2017 | Gukelberger |

FOREIGN PATENT DOCUMENTS

| | | |
|---|---|---|
| JP | 2004278433 A | 10/2004 |
| JP | 2005-054605 A | 3/2005 |
| JP | 2006-336465 A | 12/2006 |
| JP | 2011099375 A | 5/2011 |
| WO | 200071881 A1 | 11/2000 |
| WO | 2006052993 A2 | 5/2006 |
| WO | 2010146048 A1 | 12/2010 |

OTHER PUBLICATIONS

International Preliminary Report on Patentability/Written Opinion (dated Oct. 2, 2006) issued in International Patent Application No. PCT/US05/40483. (WO2006052993) (7 pgs).

U.S. Office Action dated May 28, 2013 issued in related U.S. Appl. No. 13/025,901 (17 pgs.).

U.S. Office Action dated Dec. 12, 2013 issued in related U.S. Appl. No. 13/025,901 (16 pgs.).

U.S. Office Action dated May 21, 2014 issued in related U.S. Appl. No. 13/025,901 (15 pgs.).

U.S. Office Action dated Mar. 22, 2013 issued in related U.S. Appl. No. 13/025,912 (6 pgs.).

Wu, H. et al., "Ni-Based Catalysts for Low Temperature Methane Stream Reforming: Recent Results on Ni—Au and Comparison with Other Bi-Metallic Systems", Catalysts 2013, vol. 3, pp. 563-583.

U.S. Office Action dated Jun. 27, 2016 issued in U.S. Appl. No. 14/631,384 (12 pgs).

Hacarlioglu, et al; "Studies of the Methane Steam Reforming Reaction at High Pressure in a Ceramic Membrane Reactor"; accessed Sep. 15, 2015 <<http://www.sciencedirect.com/science/article/pii/S100399530660011X>>.

Hankinson, et al; Ignition Energy and Ignition Probability of Methane-Hydrogen-Air Mixtures; accessed May 30, 2013 <<http://conference.ing.unipi.it/ichs/images/stories/papers/125.pdf>>.

Saxena, et al; "The Influence of Hydrogen and Carbon Monoxide on Structure and Burning Velocity of Methane Flames"; 2009 Fall Technical Meeting of the Western States Section of the Combusion Institute Hosted by the Univ of Cali at Irvine, CA, Oct. 26-27, 2009, Paper #09F-86, 20 pgs; accessed May 20, 2015 <<http://www.engr.ucr.edu/WSSCIConference/Exampleformat.pdf>>.

Zanfir, et al; Catalytic Combustion Assisted Methane Steam Reforming in a Catalytic Plate Reactor; Chemical Engineering Science vol. 58, pp. 3947-3960, 2003.

Caterpillar "Application and Installation Guide, Gas Engine Emissions"; © 2007 Caterpillar® (31 pgs).

U.S. Office Action dated Oct. 3, 2016 issued in related U.S. Appl. No. 14/851,890 (8 pgs).

U.S. Office Action dated Feb. 6, 2017 issued in related U.S. Appl. No. 14/718,531 (16 pgs).

Duel Fuel™ Technology, Clean Air Power; "Dual-Fuel vs Spark Ignition"; <<http://www.cleanairpower.com/dualfuelvssparkignition.html>>; (2 pgs) (accessed Oct. 2, 2017).

U.S. Office Action dated Oct. 18, 2017 issued in related U.S. Appl. No. 14/631,384 (10 pgs).

U.S. Office Action dated May 1, 2017 issued in related U.S. Appl. No. 14/631,384 (13 pgs).

\* cited by examiner

APPARATUS AND METHODS FOR EXHAUST GAS RECIRCULATION FOR AN INTERNAL COMBUSTION ENGINE POWERED BY A HYDROCARBON FUEL

FIELD

The present disclosure relates to emissions control and exhaust gas recirculation for internal combustion engines, and more particularly, to improved emissions control and exhaust gas recirculation for internal combustion engines powered by hydrocarbon (HC) fuels.

BACKGROUND

For conventional exhaust gas recirculation (EGR), exhaust gas expelled from all of the cylinders of an internal combustion engine may be collected in an exhaust manifold. A fraction of the collected exhaust gas (e.g. 5% to 10%) may then be routed from the exhaust manifold through a control valve back to an intake manifold of the engine, where it may be introduced to a stream of fresh (ambient) intake air. The remaining fraction of exhaust gas in the exhaust manifold, rather than being recirculated and recycled, generally flows to a catalytic converter of the exhaust system and, after treatment therein, may be expelled to the atmosphere.

EGR has a history of use in gasoline spark-ignition engines, and affects combustion in several ways. First, the combustion in the cylinders of the engine may be cooled by the presence of exhaust gas, that is, the recirculated exhaust gas may absorb heat from the combustion. Furthermore, the dilution of the oxygen present in the combustion chamber with the exhaust gas, in combination with the cooler combustion, may reduce the production of mono-nitrogen oxides (NOx), such as nitric oxide (NO) and nitrogen dioxide ($NO_2$). Additionally, EGR may reduce the need for fuel enrichment at high loads in turbocharged engines and thereby improve fuel economy.

EGR which uses higher levels of exhaust gas may further increase fuel efficiency and reduce emissions of spark-ignition engines. However, with higher levels of exhaust gas, engines may face challenges related to EGR control and tolerance, which may reduce the expected fuel efficiency improvement. Challenges related to EGR control may be understood to include reducing variability of the exhaust gas, particularly composition and distribution. If the variation in the exhaust gas introduced to an engine is too random, fuel efficiency improvements may suffer. Challenges related to EGR tolerance may be understood to include increasing an engine's ability to process higher levels of exhaust gas without adversely affecting performance, particularly fuel economy. Thus, even if EGR control and tolerance may be satisfactory for engine operation at low levels of EGR, an engine may need additional modifications in structure and operational conditions to accommodate higher levels of EGR without adversely affecting engine performance.

More recently, an engine configuration has been proposed with one or more cylinders of the engine are dedicated to expelling exhaust gas for EGR, which is then directed to the intake manifold. Such cylinders may be referred to as dedicated EGR, or D-EGR, cylinders. Dedicated EGR cylinder(s) may operate at a broad range of equivalence ratios since their exhaust gas is generally not configured to exit the engine before flowing through a cylinder operating at, for example, a stoichiometric or near stoichiometric air/fuel ratio. This may allow the dedicated EGR cylinder to be run rich to produce higher levels of carbon monoxide (CO) gas and hydrogen ($H_2$) gas which, may in turn, increase the octane number and promote increased EGR tolerance and knock tolerance by increasing flame/speed burn rates, as well as increasing the dilution limits of the mixture and associated combustion stability of all the cylinders. Examples of engines with a D-EGR cylinder may be found in U.S. Patent Application Publication No. 2012/0204844 entitled "Dedicated EGR Control Strategy For Improved EGR Distribution And Engine Performance" and U.S. Patent Application Publication No. 2012/0204845 entitled "EGR Distributor Apparatus For Dedicated EGR Configuration", both in the name of Jess W. Gingrich, which are assigned to the assignee of the present disclosure and hereby incorporated by reference to the extent they are consistent with the present disclosure.

In order to further increase hydrogen ($H_2$) gas production, both of the preceding Gingrich applications disclose that the carbon monoxide (CO) gas of the exhaust gas from the D-EGR cylinder may react with water ($H_2O$) vapor using a water gas shift (WGS) reaction with a suitable water gas shift (WGS) catalyst. With the WGS reaction, carbon monoxide (CO) gas in the exhaust gas may react with water vapor to produce carbon dioxide ($CO_2$) gas and hydrogen ($H_2$) gas. Reacting carbon monoxide (CO) gas in the exhaust gas with water vapor to produce hydrogen ($H_2$) gas may be understood as being beneficial by increasing the amount of hydrogen ($H_2$) gas in the exhaust gas from dedicated EGR cylinder.

However, while a water gas shift catalyst may result in production of hydrogen ($H_2$) gas, the water-gas shift catalyst exchanges carbon monoxide (CO) gas for hydrogen ($H_2$) gas and carbon dioxide ($CO_2$) gas, meaning that any hydrogen ($H_2$) gas produced results in a loss of combustible carbon monoxide (CO) gas and a gain of incombustible carbon dioxide ($CO_2$) gas, which does not provide the same level of combustion benefit as hydrogen ($H_2$).

Furthermore, the water-gas shift reaction is mildly exothermic, meaning energy is released as the reaction progresses, and thus energy is lost through the process. More particularly, for an engine system with a traditional low level EGR loop, a heat exchanger is generally utilized to reduce the temperature of the EGR feed prior to mixing with intake air. This heat is typically rejected to the engine coolant, and is then subsequently rejected to the ambient environment via the radiator. Similarly, in a gasoline D-EGR application, the energy released during the exothermic water-gas shift reaction is rejected via the same process, meaning that the energy produced by the reaction is not used in a useful manner. As a result, it may be understood that the energy content of hydrogen ($H_2$) gas created is slightly less than the energy content of the carbon monoxide (CO) gas consumed. Consequently, an alternative to use of a water gas shift reaction to generate hydrogen ($H_2$) gas is needed which does not suffer from the foregoing drawbacks.

Furthermore, it is desirable that the alternative to the water gas shift reaction be applicable to engines which utilize natural gas as a fuel, in addition to more traditional gasoline. While gasoline may be the fuel most recognized for D-EGR engines, recent advancements in shale fracking and horizontal drilling techniques have vastly improved the yields of natural gas wells in North America. This rapid increase in production has resulted in a substantial drop in the cost of natural gas, which is primarily formed of methane ($CH_4$), in the United States. This substantial and rapid drop in the cost of natural gas has resulted in renewed interest in natural gas fueled motor vehicles with improved efficiencies. The use of exhaust gas recirculation (EGR) in hydrocarbon based automotive engines has the potential to further improve the efficiency of these engines.

Moreover, it is desirable that the alternative to the water gas shift reaction not be limited to D-EGR engines and be applicable to engines other than a D-EGR engine.

SUMMARY

The present disclosure provides various apparatus and methods for treatment of exhaust gas for recirculation in an internal combustion engine powered by a hydrocarbon fuel. More particularly, the hydrocarbon powered internal combustion engine includes a steam hydrocarbon reformer which is within an exhaust gas recirculation (EGR) loop of the emissions system of the internal combustion engine. The steam hydrocarbon reformer simultaneously produces carbon monoxide (CO) gas and hydrogen ($H_2$) gas from a hydrocarbon via a steam reformation reaction using a steam reformation catalyst contained within the steam reformer.

Given that the hydrocarbon steam reformation reaction produces carbon monoxide (CO) gas and hydrogen ($H_2$) gas simultaneously, which are both combustible, the benefits of carbon monoxide (CO) gas and hydrogen ($H_2$) gas with respect to octane number and burning velocity can be realized from the steam reformation reaction. Generation of both carbon monoxide (CO) gas and hydrogen ($H_2$) gas for the EGR stream may be understood to have a positive impact on the charge properties of the EGR stream. More particularly, the combination and co-existence of carbon monoxide (CO) gas and hydrogen ($H_2$) gas in the EGR stream may improve flame speed and combustion stability, as well as improve knock and EGR tolerance.

Furthermore, the steam reformation reaction is endothermic, meaning energy is put into the reaction and thus the heating value (or energy content) of the formed carbon monoxide (CO) gas and hydrogen ($H_2$) gas mixture is greater than the heating value of the consumed methane ($CH_4$) gas. Stated another way, since the hydrocarbon steam reformation reaction is endothermic, waste heat energy (from the exhaust gas) is used to produce carbon monoxide (CO) gas and hydrogen ($H_2$) gas from hydrocarbons, thereby increasing the final energy content of the mixture. Essentially, the steam reformation catalyst functions as a chemical waste heat recuperative device, which makes use of exhaust energy (that would otherwise be rejected to the environment) in order to increase the energy content of the fuel.

The present disclosure also provides various internal combustion engine configurations which may make use of the steam hydrocarbon reformer, including internal combustion engines which may include at least one dedicated exhaust gas recirculation cylinder, which may also be referred to as a D-EGR cylinder.

In at least one embodiment, a method to process exhaust gas expelled from at least one cylinder of a plurality of cylinders of an internal combustion engine is provided by the present disclosure, which may comprise: providing an internal combustion engine, wherein the engine includes a steam hydrocarbon reformer including a steam reformation catalyst; treating exhaust gas from the engine containing hydrocarbon and water by reacting the hydrocarbon and water in the presence of the steam reformation catalyst in the steam hydrocarbon reformer to provide treated exhaust gas, wherein the treated exhaust gas includes carbon monoxide gas and hydrogen gas produced from the reaction; and mixing the treated exhaust gas, including the carbon monoxide gas and hydrogen gas produced in the steam hydrocarbon reformer, with air to provide a mixture of air and treated exhaust gas to be introduced into the cylinders of the engine.

In at least one embodiment, a method to process exhaust gas expelled from at least one cylinder of a plurality of cylinders of an internal combustion engine is provided by the present disclosure, which may comprise: providing an internal combustion engine, wherein the engine includes a steam hydrocarbon reformer including a steam reformation catalyst; introducing hydrocarbons as a fuel, and a mixture of air and treated exhaust gas, into the cylinders of the engine; operating the engine such that internal combustion occurs in the cylinders of the engine; generating untreated exhaust gas in the cylinders of the engine; expelling the untreated exhaust gas from the cylinders of the engine wherein the untreated exhaust gas contains: (1) unreacted hydrocarbons and water; or (2) water and no hydrocarbons; wherein in the case that the untreated exhaust gas contains unreacted hydrocarbons and water, optionally introducing additional hydrocarbons to the untreated exhaust gas, and wherein in the case the untreated exhaust gas contains water and no hydrocarbons, introducing hydrocarbons to the untreated exhaust gas; introducing the untreated exhaust gas containing the hydrocarbons and water into the steam hydrocarbon reformer; treating the untreated exhaust gas containing the hydrocarbon and water by reacting the hydrocarbon and water in the untreated exhaust gas in the presence of the steam reformation catalyst in the steam hydrocarbon reformer to provide treated exhaust gas, wherein the treated exhaust gas includes carbon monoxide gas and hydrogen gas produced from the reaction; and mixing the treated exhaust gas, including the carbon monoxide gas and hydrogen gas produced in the steam hydrocarbon reformer, with air to provide the mixture of air and treated exhaust gas introduced into the cylinders of the engine.

In at least one embodiment, at least a portion of the hydrocarbon of the untreated exhaust gas is introduced to the untreated exhaust gas expelled from at least one of the cylinders after the untreated exhaust gas is expelled from the cylinder.

In at least one embodiment, the hydrocarbon introduced to the untreated exhaust gas expelled from the at least one of the cylinders is introduced to the untreated exhaust gas in an exhaust gas recirculation passage of the engine.

In at least one embodiment, the exhaust gas recirculation passage of the engine includes the steam hydrocarbon reformer, and the hydrocarbon introduced to the untreated exhaust gas expelled from at least one of the cylinders is introduced to the untreated exhaust gas in the exhaust gas recirculation passage of the engine upstream of the steam hydrocarbon reformer.

In at least one embodiment, the hydrocarbon introduced to the untreated exhaust gas expelled from at least one of the cylinders is introduced to the untreated exhaust gas in the exhaust gas recirculation passage of the engine upstream of the steam hydrocarbon reformer by an injection device located in the exhaust gas recirculation passage.

In at least one embodiment, the exhaust gas recirculation passage is directly coupled to an upstream exhaust manifold of the engine.

In at least one embodiment, the exhaust gas recirculation passage includes a cooler which cools the treated exhaust gas after it leaves the steam hydrocarbon reformer and before the treated exhaust gas is mixed with the air.

In at least one embodiment, the exhaust gas recirculation passage is located downstream of an exhaust turbine and upstream of a catalytic converter.

In at least one embodiment, cooling the mixture of air and treated exhaust gas before it is introduced into the cylinders of the engine.

In at least one embodiment, compressing the mixture of air and treated exhaust gas before it is introduced into the cylinders of the engine.

In at least one embodiment, operating the engine such that internal combustion occurs in the cylinders of the engine further comprises operating the engine such that at least one of the cylinders of the engine is a dedicated exhaust gas recirculation (EGR) cylinder.

In at least one embodiment, expelling the untreated exhaust gas from the cylinders of the engine includes expelling the untreated exhaust gas from the dedicated exhaust gas recirculation (EGR) cylinder, and, when the untreated exhaust gas is expelled from the dedicated exhaust gas recirculation (EGR) cylinder, the untreated exhaust gas expelled from the dedicated exhaust gas recirculation (EGR) cylinder contains unreacted hydrocarbon.

In at least one embodiment, expelling the untreated exhaust gas from the cylinders of the engine includes expelling the untreated exhaust gas from the dedicated exhaust gas recirculation (EGR) cylinder, and, after the untreated exhaust gas is expelled from the dedicated exhaust gas recirculation (EGR) cylinder, introducing hydrocarbon to the untreated exhaust gas expelled from the dedicated exhaust gas recirculation (EGR) cylinder.

In at least one embodiment, the hydrocarbon introduced to the untreated exhaust gas expelled from the dedicated exhaust gas recirculation (EGR) cylinder is introduced to the untreated exhaust gas in an exhaust gas recirculation passage of the engine.

In at least one embodiment, the exhaust gas recirculation passage of the engine include the steam hydrocarbon reformer, and the hydrocarbon introduced to the untreated exhaust gas expelled from the dedicated exhaust gas recirculation (EGR) cylinder is introduced to the untreated exhaust gas in the exhaust gas recirculation passage of the engine upstream of the steam methane reformer.

In at least one embodiment, the hydrocarbon introduced to the untreated exhaust gas expelled from the dedicated exhaust gas recirculation (EGR) cylinder is introduced to the untreated exhaust gas in the exhaust gas recirculation passage of the engine upstream of the steam hydrocarbon reformer by an injection device located in the exhaust gas recirculation passage.

In at least one embodiment, the hydrocarbon introduced to the untreated exhaust gas expelled from the dedicated exhaust gas recirculation (EGR) cylinder after is introduced to the untreated exhaust gas in an exhaust port of the dedicated exhaust gas recirculation (EGR) cylinder.

In at least one embodiment, the hydrocarbon introduced to the untreated exhaust gas expelled from the dedicated exhaust gas recirculation (EGR) cylinder is introduced to the untreated exhaust gas in an exhaust port of the dedicated exhaust gas recirculation (EGR) cylinder by an injection device.

In at least one embodiment, an exhaust gas recirculation passage of the engine downstream of the exhaust port of the dedicated exhaust gas recirculation (EGR) cylinder includes the steam hydrocarbon reformer.

In at least one embodiment, the engine operates exclusively with natural gas fuel.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
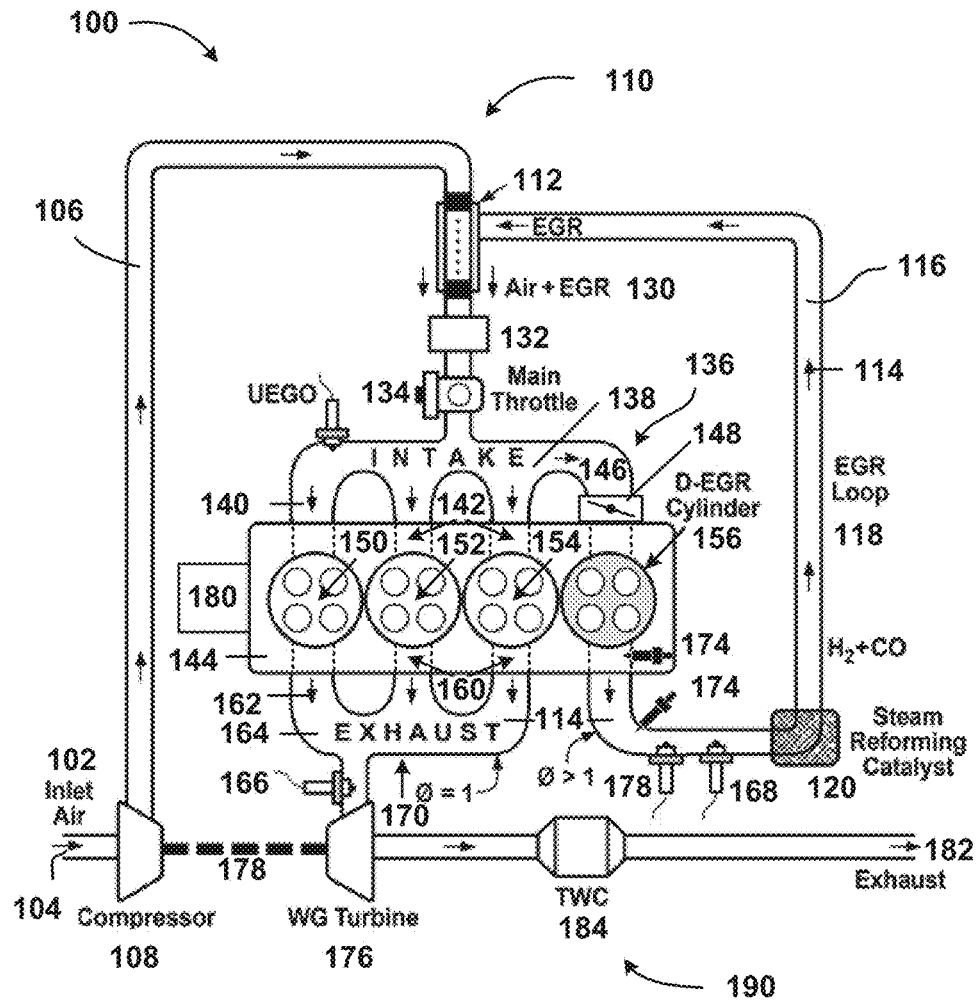
FIG. 1 is a schematic representation of an internal combustion engine having an emissions system, particularly an EGR system, with an EGR apparatus including a steam methane reformer according to a first embodiment of the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

The following description is directed to various configurations of emissions systems, particularly exhaust gas recirculation (EGR) systems, apparatuses and methods to be used with an internal combustion engine. With an EGR system, one or more cylinders of the internal combustion engine may be used to generate exhaust gas, which may then be recirculated and mixed with an intake stream of fresh (ambient) air to provide a mixed charge (mixture) of exhaust gas and air to the cylinders of the engine.

For the purposes of this disclosure, an engine configured such that substantially an entire output of exhaust gas from a cylinder is to be recirculated for EGR may be referred to herein as an engine having a dedicated EGR cylinder.

In addition, for illustration purposes, the engine herein is described as one that relies upon the use of natural gas. However, it should be appreciated that the engine herein that may benefit from steam reformation is one that relies upon the use of a hydrocarbon fuel, and hydrocarbon steam reformation, and therefore is not limited to a fuel containing methane and the use of methane steam reformation.

Referring now to the figures, FIG. 1 illustrates an internal combustion engine 100. Internal combustion engine 100 may power a vehicle that utilizes a hydrocarbon fuel, such as a natural gas vehicle (NGV), and as such may be particularly configured to be powered by natural gas, either as compressed natural gas (CNG) or liquefied natural gas (LNG). Internal combustion engine 100 may be a bi-fuel engine which is configured to operate with either natural gas or gasoline, or may be configured to operate exclusively with natural gas, either compressed natural gas (CNG) or liquefied natural gas (LNG). Natural gas may comprise 80%-99% methane ($CH_4$) gas, with liquefied natural gas (LNG) having more methane ($CH_4$) gas than compressed natural gas (CNG). Other components of natural gas may include ethane ($C_2H_6$) gas, propane ($C_3H_8$) gas, butane ($C_4H_{10}$) gas, pentane ($C_5H_{12}$) gas, nitrogen ($N_2$) gas, carbon dioxide (CO) gas, oxygen ($O_2$) gas and hydrogen ($H_2$) gas.

Internal combustion engine 100 is shown to have four cylinders 150, 152, 154 and 156, although such is not intended to limit the present disclosure. One of the cylinders, cylinder 156, may be understood to be a dedicated EGR cylinder. In other words, it may be understood that substantially all of the exhaust gas 114 expelled from cylinder 156 may be directed (recirculated) back to the intake system 110, here through an EGR feedback loop 118. The exhaust gas from the remaining three cylinders 150, 152, and 154 is directed to an exhaust system 190, with none of the exhaust gas expelled from cylinders 150, 152 and 154 recirculated to the intake system 110 of engine 100.

While it may be possible, based on the configuration of engine 100, for all of the exhaust gas (i.e. 100%) expelled from cylinder 156 to be optimally recirculated back to the intake system 110, it should be understood that certain design considerations and operating inefficiencies may only allow a substantial portion of the exhaust gas expelled from cylinder 156 to be recirculated back to the intake system 110. For example, exhaust gas losses may occur between connection points. Accordingly, it is contemplated that on a volume basis, 90% or more of the exhaust gas expelled from the dedicated EGR cylinder is recirculated to the engine intake system 110. More preferably, 90-100% of the exhaust gas expelled from cylinder 156 is recirculated, including all values therein, in 0.1% by volume increments.

Furthermore, with four cylinders of equal volume, engine 100 may also be understood to have a maximum "25% dedicated EGR content" because the exhaust gas expelled from each cylinder may be understood to have substantially the same volume, and one of the four cylinders has 100% of its exhaust gas redirected to the intake system 110, as noted above.

During an operation of engine 100, fresh (ambient) intake air 102 may enter air inlet 104 of air intake system 110. The air 102 may then travel within intake passage 106, during which time it may be compressed by intake compressor 108. Thereafter, air 102 may enter air/exhaust gas mixer 112 of air intake system 110, and more particularly as distribution mixer, which is configured to distribute and mix the recirculated and treated exhaust gas 114 into the stream of fresh air 102 to be introduced to the internal combustion engine 100.

With the operation of engine 100, treated exhaust gas 114 from dedicated EGR cylinder 156 may enter passage 116 of EGR feedback loop 118. Thereafter, treated exhaust gas 114 may enter mixer 112 of the air intake system 110 and be mixed with a stream of fresh air 102 to provide a mixture 130 of fresh air 102 and treated exhaust gas 114.

As understood in the art, the combustion of natural gas comprising methane ($CH_4$) gas/liquid with oxygen ($O_2$) gas from the fresh air 102 within dedicated EGR cylinder 156 will produce untreated exhaust gas 114 containing the combustion by-products of carbon dioxide ($CO_2$) gas and water vapor according to a reaction as shown in the following equation (1):

$$CH_4(g)+2O_2(g)\rightarrow CO_2(g)+3H_2O(v) \quad (Eq\ 1)$$

In addition to the foregoing, depending on operating conditions and stoichiometry, exhaust gas 114 may also include unburnt methane ($CH_4$) gas, as well as small amounts of hydrogen ($H_2$) gas, carbon monoxide (CO) gas and other reactive hydrocarbons. Exhaust gas 114 may include higher levels of methane ($CH_4$) gas in the event EGR cylinder 156 is run rich (i.e. phi ($\Phi$) is greater than 1.0).

After leaving the dedicated EGR cylinder 156, the untreated exhaust gas 114 enters a steam methane reformer 120 within the EGR feedback loop 118. Using a steam reformation catalyst contained within the steam hydrocarbon reformer 120, steam hydrocarbon reformer 120 simultaneously produces carbon monoxide (CO) gas and hydrogen ($H_2$) gas from unburnt hydrocarbon (e.g. $CH_4$) gas and water vapor in the untreated exhaust gas 114.

Optionally, engine 100 may include a hydrocarbon injection device 174 (e.g. a fuel injector) located in the passage 116 of EGR loop 118, or in the exhaust port 160 of the cylinder head 144 (e.g. exhaust port fuel injector) to introduce hydrocarbon such as methane ($CH_4$) gas and/or water directly into the stream of untreated exhaust gas 114 from dedicated EGR cylinder 156, or methane ($CH_4$) liquid which rapidly changes phase to a gas. Such may be particularly useful to increase the amount of hydrocarbon such as methane ($CH_4$) gas in the untreated exhaust gas 114 in the event the amount of hydrocarbon such as methane ($CH_4$) gas in the untreated exhaust gas 114 from dedicated EGR cylinder 156 is insufficient. Engine 100 may include a hydrocarbon sensor such as a methane sensor 178 which may detect methane in untreated exhaust gas 114 and which may be configured and arranged to operate with engine controller 180. After methane sensor 178 determines a level of methane ($CH_4$) gas in untreated exhaust gas 114, the engine controller 180 may than introduce a hydrocarbon such as methane ($CH_4$) and/or water from methane/water injection device 174 if such in the untreated exhaust gas 114 is insufficient in accordance with a programed algorithm based on operating conditions.

The following equation (2) illustrates a steam reformation reaction which simultaneously produces carbon monoxide (CO) gas and hydrogen ($H_2$) gas from methane ($CH_4$) gas and water vapor:

$$CH_4(g)+H_2O(v)\rightarrow CO(g)+3H_2(g) \quad (Eq\ 2)$$

However, more generally herein, the steam reformation reaction for a hydrocarbon may be written as follows:

$$CnHm(g)+nH_2O(v)\rightarrow (n+m/2)H_2+nCO(g) \quad (Eq\ 2a)$$

Thus, reacting a hydrocarbon such as methane ($CH_4$) gas and water vapor in the untreated exhaust gas 114 from dedicated EGR cylinder 156 to produce carbon monoxide (CO) gas and hydrogen ($H_2$) gas is beneficial by increasing the amount of carbon monoxide (CO) gas and hydrogen ($H_2$) gas in the untreated exhaust gas 114 from dedicated EGR cylinder 156.

The steam reformation catalyst may comprise nickel (Ni) as the active metal. For example, the steam reformation catalyst may comprise Ni-M composition, where M=gold (Au), silver (Ag), tin (Sn), copper (Cu), cobalt (Co), molybdenum (Mo), iron (Fe), gadolinium (Gd) or boron (B). Apart from such N-M compositions, one may also use palladium (Pd) or platinum (Pt) as the steam reformation catalyst. A particularly preferred catalyst is nickel or palladium. Preferably, the steam reformation reaction is carried out at temperatures at or above 500° C.

Untreated exhaust gas 114 entering steam hydrocarbon reformer 120 preferably may have a temperature in a range of 400° C. to 800° C., and be exposed to a pressure in a range of 14.7 psi. to 44 psi. It is generally desirable to maintain exhaust temperatures as high as possible to increase production of carbon monoxide (CO) gas and hydrogen (H$_2$) gas from a hydrocarbon such as methane (CH$_4$) gas.

As such, for D-EGR applications, one particular placement of the steam hydrocarbon reformer 120 is as close to the exhaust port 160 as possible, so that the temperature of the exhaust gas 114 entering the steam hydrocarbon reformer 120 is as high as possible. Furthermore, one particular placement of the hydrocarbon/water injection device 174 upstream of the steam hydrocarbon reformer 120 is in the exhaust port 160 of the cylinder head 144. As may be appreciated, one may use a plurality of hydrocarbon/water injection devices 174. As illustrated in FIG. 1, two separate hydrocarbon injection devices are shown.

Figure 2:
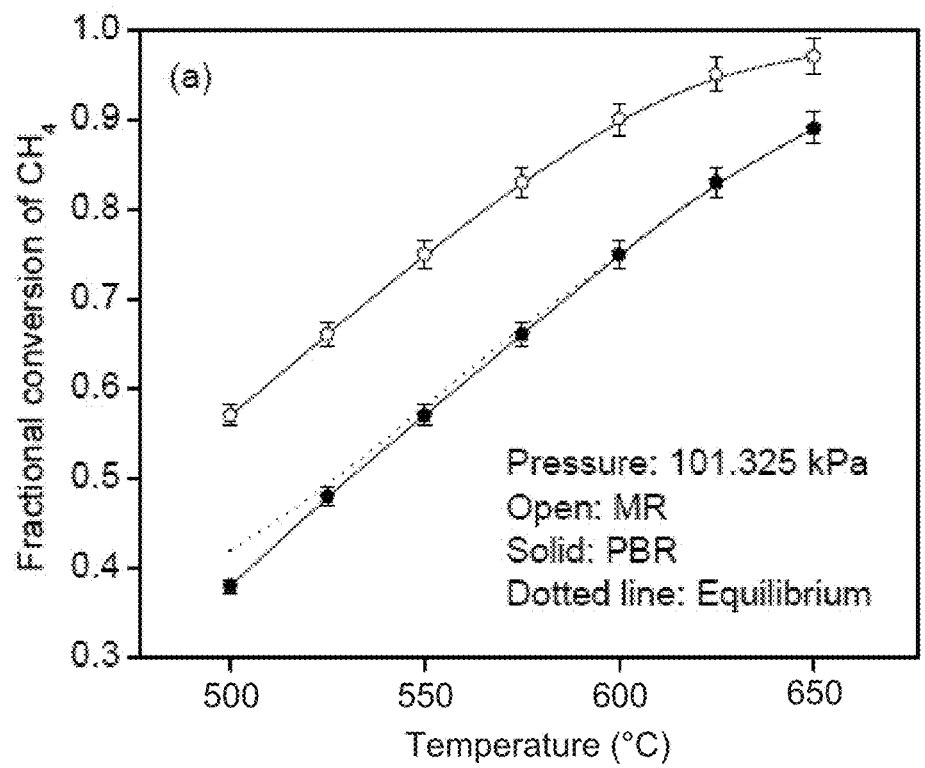
FIG. 2 is a graphical representation of the conversation efficiency of an exemplary steam reformation catalyst as a function of temperature for both a packed bed reactor (PBR) and a membrane reactor (MR)

As shown by FIG. 2, the efficiency of an exemplary steam reformation catalyst (e.g. Ni/MgAl$_2$O$_4$) at 1 atmosphere (i.e. 101.325 kPa) increases as a function of temperature, with the fractional conversion of methane (CH$_4$) gas to carbon monoxide (CO) gas and hydrogen (H$_2$) gas increasing almost 150% when the exhaust gas increases in temperature from 500° C. to 650° C. As may therefore be appreciated, the temperature in the steam hydrocarbon reformer 120 may be at or above 500° C., or in the range of 500° C. to 800° C.

Furthermore, as shown by FIG. 2, the use of a membrane reactor (MR) at the team reformer may further improve carbon monoxide (CO) gas and hydrogen (H$_2$) gas production as compared to a packed bed reactor (PBR). A membrane reactor may be understood as a catalyst-filled reaction chamber that includes a membrane that can add reactants or remove products from the reaction media. As shown in FIG. 2, use of a membrane reactor (MR) may convert a hydrocarbon such as methane (CH$_4$) gas at an increased efficiency in a range of 10% to 50% over the 500° C. to 650° C. temperature range as compared to a packed bed reactor (PBR), which amounts to a hollow tube or pipe or other vessel filled with a packing material. Since the hydrocarbon or methane (CH$_4$) steam reformation reaction is reversible in nature, continuous removal of hydrogen (H$_2$) gas from the gas feed (as is achieved with a membrane reactor) can result in increased yields of carbon monoxide (CO) gas and hydrogen (H$_2$) gas.

The amount of unburned hydrocarbon such as methane (CH$_4$) gas from dedicated EGR cylinder 156, as well as the amount of carbon monoxide (CO) gas and hydrogen (H$_2$) gas created in dedicated EGR cylinder 156, and subsequently entering the steam hydrocarbon reformer 120 is a function of the dedicated EGR cylinder air/fuel ratio and spark timing. For example, if dedicated EGR cylinder 156 is run rich of stoichiometric A/F (air/fuel) ratio, a relatively significant amount of carbon monoxide (CO) and hydrogen (H$_2$) may be formed prior to the use of the methane reformer 120.

The amount of carbon monoxide (CO) gas and hydrogen (H$_2$) gas further created in the hydrocarbon reformer 120 is dependent on exhaust gas temperature and the amount of hydrocarbon or methane (CH$_4$) gas in the untreated exhaust gas 114 entering the reformer 120, with the hydrocarbon or methane (CH$_4$) gas either being present in the exhaust gas 114 when it is expelled from the EGR cylinder 156 and/or being added to the exhaust gas 114 after being expelled from the EGR cylinder 156 via injection device 174. Thus, performance of the steam reformation catalyst is dependent on exhaust gas temperature, with the amount of carbon monoxide (CO) gas and hydrogen (H$_2$) gas exiting the steam hydrocarbon reformer 120 being dependent on the amount existing prior to use of the steam hydrocarbon reformer 120 and the amount created in the steam hydrocarbon reformer 120

After being mixed in mixer 112, air/exhaust gas mixture 130 may then flow in passage 106 to cooler 132 (e.g. heat exchanger) to remove heat therefrom and correspondingly increase the density thereof. In the cooler 132, the air/exhaust gas mixture 130 is cooled to a temperature in a range of 30° C. to 60° C.

After being cooled by cooler 132, air/exhaust gas mixture 130 may then flow to an intake flow restrictor 134, such as an intake throttle valve (a mechanism by which a flow of the air/exhaust gas mixture 130 is managed by restriction or obstruction) configured to restrict the volumetric flow and amount (mass) of air/exhaust gas mixture 130 provided to cylinders 150, 152, 154 and 156. The intake throttle valve may more particularly comprise a butterfly valve that restricts the flow and amount of air/exhaust gas mixture 130 entering the intake manifold 136 and ultimately provided to cylinders 150, 152, 154 and 156. Intake flow restrictor 134 may be considered to be a primary flow restrictor in that it may similarly restrict the flow of the air/exhaust gas mixture 130 to all of cylinders 150, 152, 154 and 156.

Intake flow restrictor 134 may be located at the entrance of intake manifold 136. Intake manifold 136 may comprise a plenum 138 through which the air/exhaust gas mixture 130 may flow to a plurality of intake passages/runners 140, shown with one passage/runner 140 dedicated to each cylinder 150-156. Each passage/runner 140 may then feed the air/exhaust gas mixture 130 directly into an intake port 142 (shown by dotted lines) of a cylinder head 144, shown with one port 142 dedicated to each cylinder 150-156.

After entering cylinders 150-156, the air/exhaust gas mixture 130 may be ignited by an igniter (not shown) and combust therein. After combustion of the air/exhaust gas mixture 130 within cylinders 150-156, untreated exhaust gas 114 from cylinders 150, 152 and 154 may flow through exhaust ports 160 of cylinder head 144 and exhaust passages/runners 162 of exhaust manifold 170, shown with one exhaust port 160 and one passage/runner 162 dedicated to each cylinder 150-154, and then be collected in collector 164.

From collector 164, untreated exhaust gas 114 may then flow through turbine 176, which may turn intake compressor 108 by shaft 178. After turbine 176, untreated exhaust gas 114 may flow through exhaust passage 182 to catalytic converter 184 to be treated therein before being expelled from exhaust system 190 and into the atmosphere. Catalytic converter 184 may comprise a three-way catalytic converter. In other words, a catalytic converter which performs the following:

Reduction of nitrogen oxides to nitrogen and oxygen by the reaction:

$$2NO_x(g) \rightarrow xO_2(g) + N_2(g) \tag{Eq 3}$$

Oxidation of carbon monoxide to carbon dioxide by the reaction:

$$2CO(g) + O_2(g) \rightarrow 2CO_2(g) \tag{Eq 4}$$

Oxidation of unburnt hydrocarbons (HC) to carbon dioxide and water by the reaction:

$$C_xH_{2x+2}(g) + \left[\frac{3x+1}{2}\right]O_2(g) \rightarrow xCO_2(g) + (x+1)H_2O(v) \tag{Eq 5}$$

To control the air/fuel ratio, untreated exhaust gas 114 from cylinders 150, 152 and 154 may be sampled by an exhaust gas oxygen (EGO) sensor 166, which may more particularly comprise a heated exhaust gas oxygen (HEGO) sensor, while untreated exhaust gas 114 from cylinder 156 may be sampled by an exhaust gas oxygen (EGO) sensor 168, which may more particularly comprise a universal exhaust gas oxygen (UEGO) sensor.

To control the mass and volumetric flow rate of the air/exhaust gas mixture 130 entering dedicated EGR cylinder 156, the portion of the intake passage 146 dedicated to cylinder 156 may include an intake charge flow restrictor 148, such as a throttle valve, configured and arranged to restrict the flow and amount of air/exhaust gas mixture 130 entering cylinder 156 without restricting the flow and amount of air/exhaust gas mixture 130 entering remaining cylinders 150, 152 or 154. The throttle may more particularly comprise a butterfly valve that restricts the amount of air/exhaust gas mixture 130 entering cylinder 156.

Flow restrictor 148 may be considered to be a secondary flow restrictor in that it may restrict the flow of the air/exhaust gas mixture 130 to a particular cylinder, here cylinder 156, as opposed to all the cylinders, after the air/exhaust gas mixture 130 has flowed past primary flow restrictor 134. Flow restrictor 148 may be used in conjunction with intake/exhaust valves, fuel injectors and engine controller 180 of engine 100 to operate or otherwise control dedicated EGR cylinder 156 at the same or different air/fuel ratio than cylinders 150, 152 and 154. Further, each cylinder 150-156 may be independently operated at an air/fuel ratio which is greater than (rich), equal to, or less than (lean) a stoichiometric ratio for the air and fuel.

As shown in FIG. 1, flow restrictor 148 may be located on the intake side of cylinder 156 for intake restriction. Flow restrictor 148 may be attached to the intake manifold 136, or arranged between the intake manifold 136 and the cylinder head 144.

As flow restrictor 148 may be at least partially closed, the flow and amount of air/exhaust gas mixture 130 entering cylinder 156 may be decreased. Simultaneously, the air/exhaust gas mixture 130 entering cylinders 150, 152 and 154 may be increased, provided flow restrictor 134 remains unchanged. Thus, the flow and amount of the air/exhaust gas mixture 130 entering cylinder 156 may be inversely related to the flow and amount of the air/exhaust gas mixture 130 entering cylinders 150, 152 and 154. That is, as the flow and amount of the air/exhaust gas mixture 130 entering cylinder 156 may be decreased, the flow and amount of the air/exhaust gas mixture 130 entering cylinders 150, 152 and 154 may be increased, and vice-versa.

As indicated above, without the use of flow restrictor 148, the engine 100 in FIG. 1 may be understood to have a maximum "25% dedicated EGR content" because the exhaust gas expelled from each cylinder 150-156 may be understood to have substantially the same volume, and one of the four cylinders, cylinder 156, has 90-100% by volume of its exhaust gas redirected to the intake manifold 136.

However, with the use of flow restrictor 148, the volume of exhaust gas expelled from cylinder 156 may now be varied by restricting the amount of air/exhaust gas 130 which is consumed by cylinder 156 such at the engine 100 may provide, for example, between 0.1% and 25% dedicated EGR. By decreasing the flow and amount of air/exhaust gas 130 which is consumed by cylinder 156, the flow and amount of untreated exhaust gas 114 expelled from cylinder 156 and processed through steam hydrocarbon reformer 120 to air intake system 110 may be correspondingly decreased, which will decrease amount of treated exhaust gas 114 provided to the cylinders 150, 152, 154 and 156.

Figure 3:
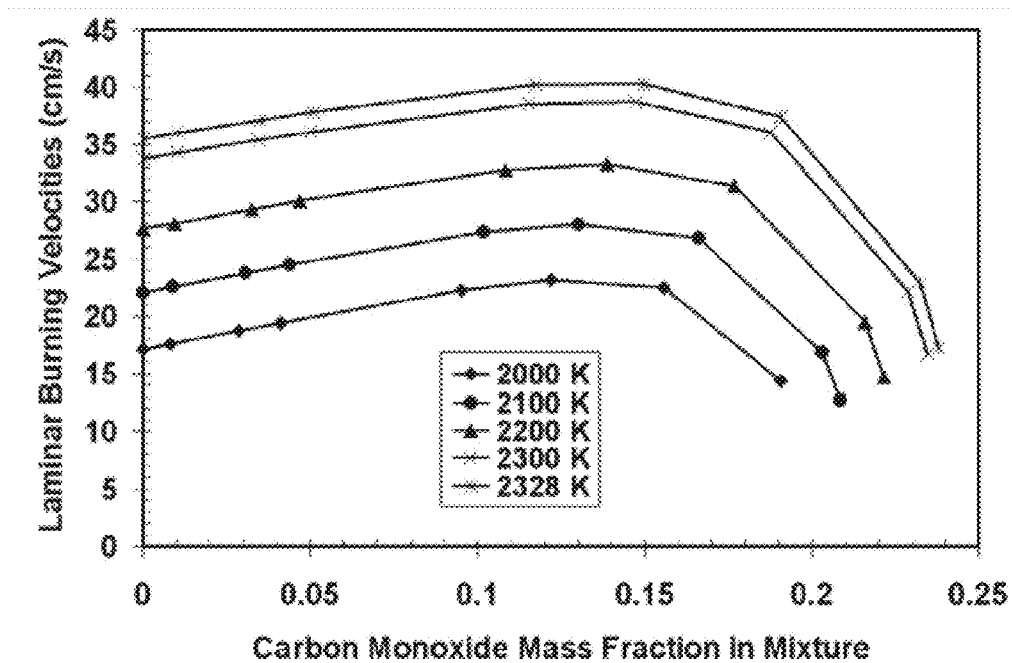
FIG. 3 is a graphical representation is a laminar burning velocity of a flame fueled by a mixture of methane ($CH_4$) gas and carbon monoxide (CO) gas.

Restriction of untreated exhaust gas 114 expelled from cylinder 156 may be particularly necessary if the quantity of treated exhaust gas 114 adversely effects engine performance. For example, as shown by FIG. 3, while addition of carbon monoxide (CO) gas to a methane ($CH_4$) fueled flame at concentrations of less than 15%, may increase burning velocity of the flame by about 15%, as more carbon monoxide (CO) gas is added to the mixture, the burning velocity decreases quickly.

Figure 4:
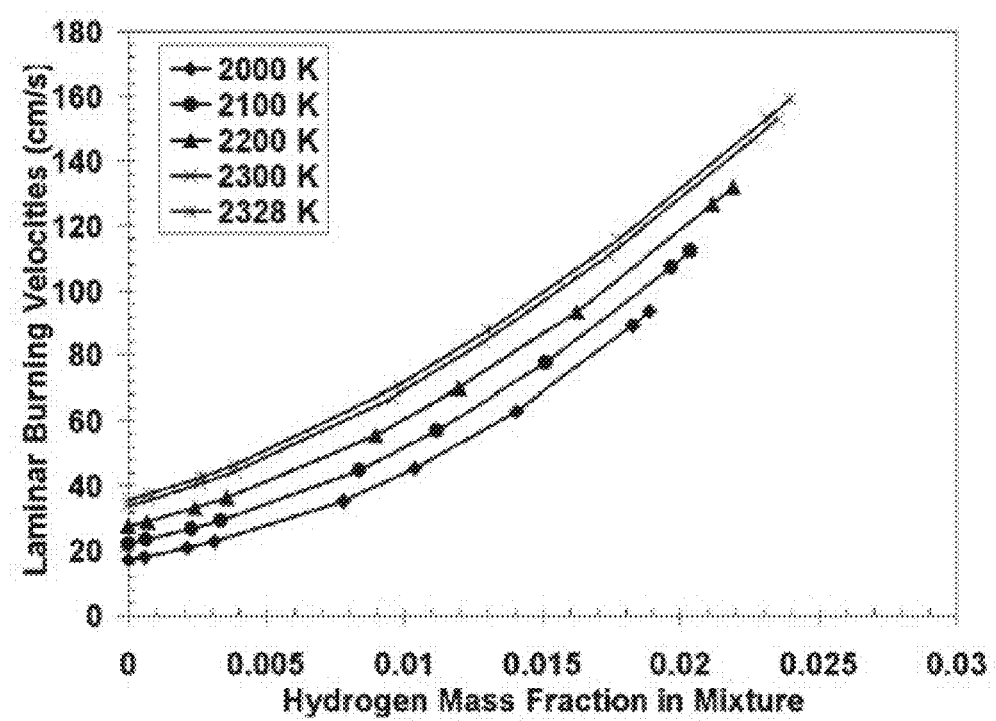
FIG. 4 is a graphical representation is a laminar burning velocity of a flame fueled by a mixture of methane ($CH_4$) gas and hydrogen ($H_2$) gas.

In contrast, as shown by FIG. 4, the addition of small amounts of hydrogen ($H_2$) gas to a methane ($CH_4$) fueled flame results in a substantial increase in burning velocity of the mixed flame.

For the applicable range of carbon monoxide (CO) gas and hydrogen ($H_2$) gas concentration in the present disclosure, the addition of carbon monoxide (CO) gas and hydrogen ($H_2$) gas to the charge feed preferably would only increase burning velocity of the mixture. As such, it may become necessary to limit the amount of exhaust gas produced from cylinder 156, and more particularly the amount of carbon monoxide (CO) gas produced, by use of flow restrictor 148.

Figure 5:
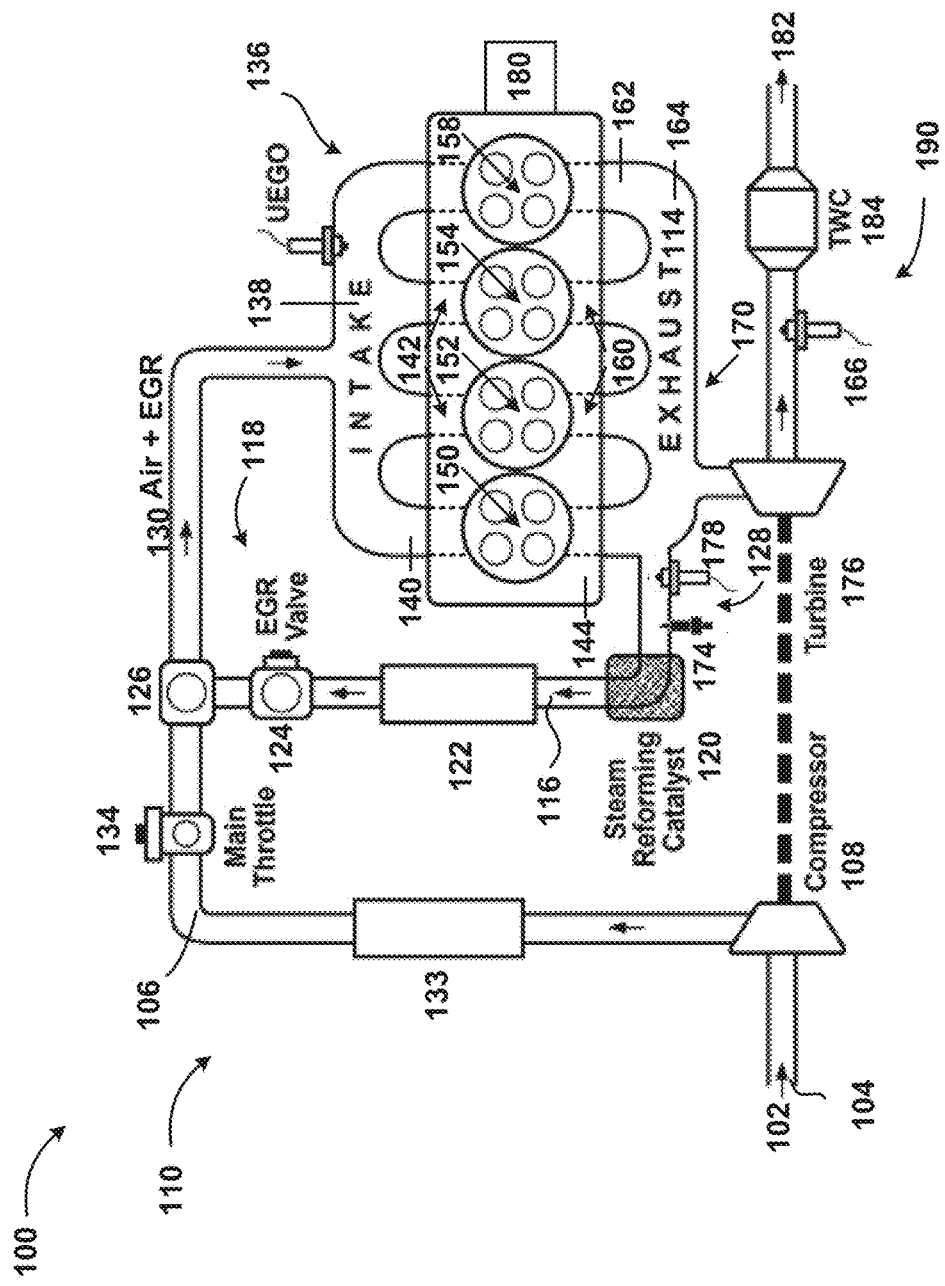
FIG. 5 is a schematic representation of an internal combustion engine having an emissions system, particularly an EGR system, with an EGR apparatus including a steam methane reformer according to a second embodiment of the present disclosure.

The present disclosure also has application for hydrocarbon powered (e.g. natural gas powered) internal combustion engines 100 which do not make use of a dedicated EGR cylinder 156. Referring now to FIG. 5, there is shown a first embodiment of an internal combustion engine 100 in which untreated exhaust gas 114 expelled from all the cylinders 150, 152, 154 and 158 may be used for EGR which, more particularly, may be understood to utilize low pressure loop EGR (LPL-EGR), which may be understood to operate at an operating pressure in a range of 0 psi to 0.5 psi.

As shown, untreated exhaust gas 114 from all the cylinders 150, 152, 154 and 158 flows from the exhaust manifold 170 to either turbine 176 or steam hydrocarbon reformer 120 within take-off branch 128 of the EGR feedback loop 118, with an EGR valve 124 controlling the amount of untreated exhaust gas 114 flowing into take-off branch 128 of the EGR feedback loop 118.

Since cylinders 150, 152, 154 and 158 may be operated at or near stoichiometric air/fuel ratio, engine 100 may include a hydrocarbon/water injection device 174 (e.g. a fuel injector) in the take-off branch 128 of the EGR loop 118 after the exhaust manifold 170, to introduce a hydrocarbon such as methane ($CH_4$) into untreated exhaust gas 114.

After flowing through steam hydrocarbon reformer 120, the treated exhaust gas 114 then flows through an EGR cooler 122 (e.g. heat exchanger) where it is cooled to a temperature in a range of 90° C. to 150° C. Thereafter, the amount of treated exhaust gas 114 to be mixed with fresh air 102 is controlled by EGR valve 124. At the same time, fresh air 102 flows through cooler 133 (e.g. heat exchanger) which cools the fresh air 102 to a temperature in a range of 30° C. to 60° C. Once the fresh air 102 has been cooled by cooler 133, the volume of fresh air 102 flowing through the intake system 110 of the internal combustion engine 100 is controlled by intake flow restrictor 134 (e.g. throttle valve).

Fresh air 102 which flows through intake flow restrictor 134 and treated exhaust gas 114 which flows through EGR valve 124 may then mix in air/exhaust gas mixer 126 of air intake system 110, and more particularly a venturi mixer, which is configured to distribute and mix recirculated treated exhaust gas 114 into the stream of fresh air 102 to be introduced to the internal combustion engine 100. The mixture 130 of fresh air 102 and treated exhaust gas 114 may then flow into the intake manifold 136 and into cylinders 150, 152, 154 and 158.

Thus, one particular placement of the steam hydrocarbon reformer 120 is as close to the exhaust manifold 170 as possible so that the temperature of the exhaust gas 114 entering the steam hydrocarbon reformer 120 is as high as possible. Moreover, placement of the steam hydrocarbon reformer 120, as well as the hydrocarbon/water injection device 174, is in a take-off branch 128 of the exhaust system 190 with an entrance to the take-off branch directly coupled to the exhaust manifold 170.

Figure 6:
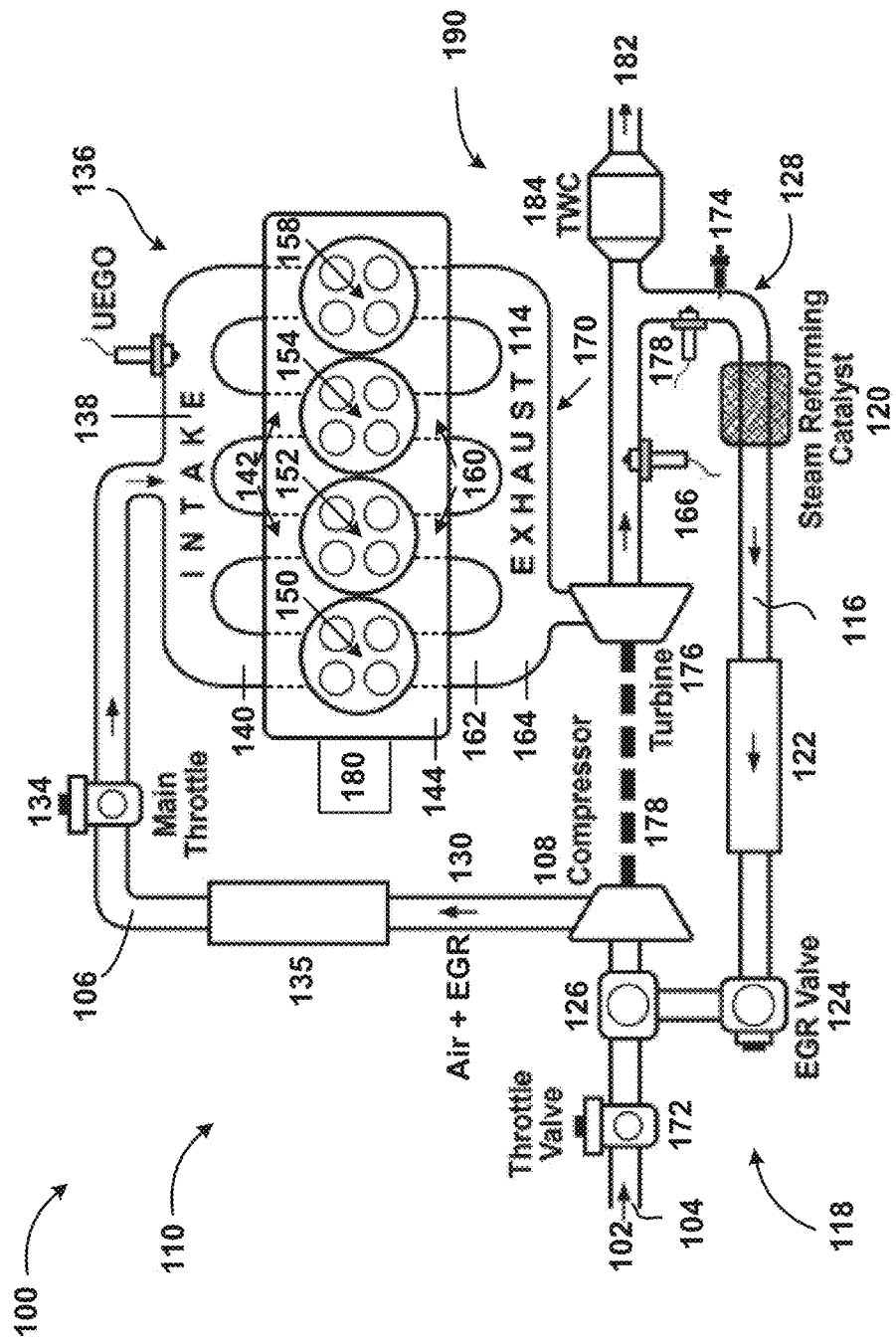
FIG. 6 is a schematic representation of an internal combustion engine having an emissions system, particularly an EGR system, with an EGR apparatus including a steam methane reformer according to a third embodiment of the present disclosure.

Referring now to FIG. 6, there is shown a second embodiment of an internal combustion engine 100 in which untreated exhaust gas 114 expelled from all the cylinders 150, 152, 154 and 158 may be used for EGR which, more particularly, may be understood to utilize high pressure loop EGR (HPL-EGR), which may be understood to operate at an operating pressure in a range of 0 psi to 40 psi. As shown, untreated exhaust gas 114 from all the cylinders 150, 152, 154 and 158 flows from the exhaust manifold 170 to turbine 176. After flowing through turbine 176, the untreated exhaust gas 114 is routed to either catalytic converter 184 or steam hydrocarbon reformer 120 within take-off branch 128 of the EGR feedback loop 118, with an EGR valve 124 controlling the amount of untreated exhaust gas 114 flowing into the EGR feedback loop 118.

Since cylinders 150, 152, 154 and 158 may be operated at or near stoichiometric air/fuel ratio, engine 100 may include a hydrocarbon/water injection device 174 (e.g. a fuel injector) in the take-off branch 128 of the EGR loop 118, such as in take-off branch 128 of the EGR loop 118 after turbine 176 and before catalytic converter 184, to introduce a hydrocarbon such as methane ($CH_4$) into untreated exhaust gas 114.

After flowing through steam methane reformer 120, the treated exhaust gas 114 then flows through an EGR cooler 122 where it is cooled to a temperature in a range of 90° C. to 150° C. Thereafter, the amount of treated exhaust gas 114 to be mixed with fresh air 102 is controlled by EGR valve 124. At the same time, fresh air 102 flows into air inlet 104 of intake passage 106. The volume of fresh air 10 flowing through the intake system 110 of the internal combustion engine 100 is controlled by intake flow restrictor 172 (e.g. throttle valve).

Fresh air 102 which flows through intake flow restrictor 172 and treated exhaust gas 114 which flows through EGR valve 124 may then mix in air/exhaust gas mixer 126 of air intake system 110, and more particularly a venturi mixer, which is configured to distribute and mix recirculated treated exhaust gas 114 into the stream of fresh air 102 to be introduced to the internal combustion engine 100.

After flowing through air/exhaust gas mixer 126, the mixture 130 of fresh air 102 and treated exhaust gas 114 may then flow into intake compressor 108 where it is compressed (pressurized). From the intake compressor 108, the mixture 130 of fresh air 102 and treated exhaust gas 114 may then flow through cooler 135 (e.g. heat exchanger) to remove heat therefrom and correspondingly increase the density thereof. In the cooler 135, the air/exhaust gas mixture 130 is cooled to a temperature in a range of 30° C. to 60° C.

The volume of mixture 130 of fresh air 102 and treated exhaust gas 114 flowing through the intake system 110 of the internal combustion engine 100 is controlled by intake flow restrictor 134 (e.g. throttle valve). Thereafter, the mixture 130 of fresh air 102 and treated exhaust gas 114 may then flow into the intake manifold 136 and into cylinders 150, 152, 154 and 158.

Thus, for HPL-EGR applications, exhaust gas 114 downstream of the turbine 176 is utilized for EGR, with one particular placement of the steam hydrocarbon reformer 120 being as close to the turbine 176 as possible so that the temperature of the exhaust gas 114 entering the steam hydrocarbon reformer 120 is as high as possible. Moreover, placement of the steam hydrocarbon reformer 120, as well as the hydrocarbon/water injection device 174, is in a take-off branch 128 of the exhaust system 190 with an entrance to the take-off branch after the turbine 176 and upstream of the catalytic converter 182 to prevent exhaust emission of $CH_4$ and upstream of the steam reformation catalyst.

For operation of steam reformation catalysts in an environment containing appreciable amounts of sulfur which may poison the catalyst, it may be necessary to utilize a regenerable or replaceable sulfur trap upstream of the steam reformation catalyst in order prevent sulfation of the steam reformation catalyst. Natural gas streams are typically very free of sulfur, and as such may allow for effective use of regenerable or replaceable sulfur traps with satisfactory replacement or regeneration intervals.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method to process exhaust gas expelled from at least one cylinder of a plurality of cylinders of an internal combustion engine, the method comprising:
   providing an internal combustion engine, wherein the engine includes an exhaust turbine, an exhaust gas recirculation passage, a catalytic converter, an injection device and a steam hydrocarbon reformer, including a steam reformation catalyst,
       wherein the exhaust gas recirculation passage is located downstream of the exhaust turbine and upstream of the catalytic converter,
       wherein the exhaust gas recirculation passage of the engine located downstream of the exhaust turbine and upstream of the catalytic converter includes the steam hydrocarbon reformer and the injection device, and
       wherein the injection device is located in the exhaust gas recirculation passage upstream of the steam hydrocarbon reformer;
   forming a mixture of air and treated exhaust gas to enter the cylinders of the engine, wherein the mixture of air and treated exhaust gas is formed before entering the cylinders of the engine;
   introducing hydrocarbon as a fuel, and the mixture of air and treated exhaust gas, into the cylinders of the engine, wherein the hydrocarbon fuel is not from the mixture of air and treated exhaust gas;
   operating the engine such that internal combustion occurs in the cylinders of the engine;
   generating untreated exhaust gas in the cylinders of the engine;
   expelling the untreated exhaust gas from the cylinders of the engine through the exhaust turbine to the exhaust gas recirculation passage, wherein the untreated exhaust gas contains: (1) unreacted hydrocarbon and water; or (2) water and no hydrocarbon;

wherein in the case that the untreated exhaust gas contains unreacted hydrocarbon and water, optionally introducing additional hydrocarbon to the untreated exhaust gas using the injection device such that the additional hydrocarbon is introduced in the exhaust gas recirculation passage of the engine upstream of the steam hydrocarbon reformer, and when the untreated exhaust gas contains water and no hydrocarbon, introducing hydrocarbon to the untreated exhaust gas using the injection device such that the hydrocarbon is introduced in the exhaust gas recirculation passage of the engine upstream of the steam hydrocarbon reformer;

introducing the untreated exhaust gas containing the hydrocarbon and water into the steam hydrocarbon reformer;

treating the untreated exhaust gas containing the hydrocarbon and water by reacting the hydrocarbon and water in the untreated exhaust gas in the presence of the steam reformation catalyst in the steam hydrocarbon reformer to provide treated exhaust gas, wherein the treated exhaust gas includes carbon monoxide gas and hydrogen gas produced from the reaction; and mixing the treated exhaust gas, including the carbon monoxide gas and hydrogen gas produced in the steam hydrocarbon reformer, with air to provide the mixture of air and treated exhaust gas introduced into the cylinders of the engine.

2. The method of claim 1 further comprising:
directly coupling the exhaust gas recirculation passage to an upstream exhaust manifold of the engine.

3. The method of claim 1 wherein:
the exhaust gas recirculation passage includes a cooler; and further comprising cooling the treated exhaust gas with the cooler after it leaves the steam hydrocarbon reformer and before the treated exhaust gas is mixed with the air.

4. The method of claim 1 further comprising:
cooling the mixture of air and treated exhaust gas before it is introduced into the cylinders of the engine.

5. The method of claim 1 further comprising:
compressing the mixture of air and treated exhaust gas before it is introduced into the cylinders of the engine.

6. The method of claim 1 further comprising:
operating the engine exclusively with natural gas fuel.

7. The method of claim 1 wherein:
the steam reformation catalyst comprises at least one of nickel, palladium and platinum.

8. The method of claim 1 further comprising:
introducing the untreated exhaust gas containing the hydrocarbon and water into the steam hydrocarbon reformer at a temperature in a range of 400° C. to 800° C.

9. The method of claim 1 wherein:
the steam hydrocarbon reformer comprises a packed bed reactor.

10. The method of claim 1 wherein:
the steam hydrocarbon reformer comprises a membrane reactor.

* * * * *